United States Patent [19]

Swanson

[11] Patent Number: 5,222,204
[45] Date of Patent: Jun. 22, 1993

[54] PIXEL INTERPOLATION IN PERSPECTIVE SPACE

[75] Inventor: Roger W. Swanson, Fort Collins, Colo.

[73] Assignee: Hewlett-Packard Company, Palo Alto, Calif.

[21] Appl. No.: 493,189

[22] Filed: Mar. 14, 1990

[51] Int. Cl.⁵ ............................................. G06F 15/72
[52] U.S. Cl. .................................. 395/127; 395/126; 395/132
[58] Field of Search ............... 395/127, 126, 129, 131, 395/132, 130; 340/728, 729

[56] References Cited

U.S. PATENT DOCUMENTS

| | | | |
|---|---|---|---|
| 4,709,231 | 11/1987 | Sakaibara et al. | 340/729 |
| 4,819,192 | 4/1989 | Kuragano et al. | 395/127 X |
| 4,862,392 | 8/1989 | Steiner | 395/127 |
| 4,974,177 | 11/1990 | Nishiguchi | 395/127 X |
| 5,001,651 | 3/1991 | Rehme et al. | 395/126 |
| 5,025,405 | 6/1991 | Swanson | 395/126 X |
| 5,031,117 | 7/1991 | Minor et al. | 395/126 X |
| 5,060,172 | 10/1991 | Engelse et al. | 340/729 X |
| 5,103,217 | 4/1992 | Cawley | 395/129 |

Primary Examiner—Gary V. Harkcom
Assistant Examiner—Raymond J. Bayerl
Attorney, Agent, or Firm—Guy J. Kelley

[57] ABSTRACT

A method and apparatus for interpolating pixels to be displayed on a display screen so as to account for the nonlinearity of distance changes in the perspective projection of a 3-D object onto the display for corresponding linear distance changes in 3-D world space. Each pixel of an input polygon to be displayed on the display screen is given a perspective value in world coordinates for each display point, and this value is passed through the graphics processor along with the shading parameters associated with the each display point. The respective shading parameters for each display point are then scaled by the perspective value for each display point to account for the effects of perspective foreshortening of the displayed object on the display screen. Since no translation to world coordinates is required for the perspective scaling, fast hardware circuitry may be used. The rendered image of the invention has much improved color accuracy since the shading more closely reflects the effects of changing perspective in world space.

14 Claims, 3 Drawing Sheets

PIXEL INTERPOLATION IN PERSPECTIVE SPACE

BACKGROUND OF THE INVENTION

1. Field of the Invention

The present invention relates to a method and apparatus for interpolating display pixels in perspective space, and more particularly, to a pixel processor which scales the display parameters of each display pixel in accordance with perspective values in world coordinates assigned to each display pixel.

2. Description of the Prior Art

In three-dimensional graphics systems, three-dimensional images are displayed on a two-dimensional monitor by projecting the three-dimensional image onto a two-dimensional projection plane. The projection plane is then translated to correspond to the display plane of the display monitor. Such a process is performed by first specifying a view volume in world coordinates of an object to be displayed projecting the object onto the projection plane, and then defining a viewport on the view surface. Conceptually, objects in the three-dimensional world are clipped against the three-dimensional view volume and are then projected onto the projection plane. The contents of the display window, which is itself the projection of the view volume onto the projection plane, are then transformed (mapped) into the viewport for display.

In general, the projection of a three-dimensional object is defined by straight projection rays emanating from a center of projection which passes through each point of the object and intersects the projection plane to form the projection. Such planar geometric projections are divided into two basic classes: perspective and parallel. The distinction is in the relation of the center of projection to the projection plane. If the distance from the one to the other is finite, then the projection is perspective, while if the distance is infinite, the projection is parallel. Thus, in order to define a perspective projection, its center of projection must be specified, while for a parallel projection, its direction of projection must be specified.

Perspective projection is generally preferred over parallel projection in graphics systems because perspective projection creates a visual effect similar to that of photographic systems and the human visual system. In other words, when identifying one or more point light sources about an image to be displayed on a graphics monitor, perspective projection may be used with some degree of realism to achieve an apparent three-dimensional image from a two-dimensional display. This realism is caused by an effect known as perspective foreshortening, where the size of the perspective projection of an object varies inversely with the distance of the object from the center of projection of the light source. However, while the perspective projection of objects may be realistic, the effect of this projection makes it difficult to record the exact shape and measurements of the objects since distances cannot be taken from the projection, angles are preserved only on those faces of the object which are parallel to the projection plane, and parallel lines generally do not project as parallel lines.

This latter aspect of perspective projection, namely, that parallel lines do not project as parallel lines, is shown by way of example in FIG. 1. FIG. 1 illustrates the perspective projection of a set of parallel lines into the page. For ease of explanation, the lines of FIG. 1 may be thought of as railroad tracks which extend from a viewer in the foreground to infinity in the background in the direction into the page. The effects of perspective foreshortening are evidenced by the fact that the railroad tracks (which are of course parallel) do not appear to be parallel in the projection plane (in this case, the page) and instead appear to converge to a vanishing point. In 3-D, the parallel lines would meet only at infinity, so the vanishing point can be thought of as the projection of a point at infinity. As a result, although changes in distance along the segment AB are linear in world coordinates, changes in distance in the projection plane are nonlinear. For example, although point C is depicted in the projection plane to be at a distance over half-way from point A to point B, because of perspective foreshortening point C is really only at a point in world coordinates which is a distance approximately one-fourth of the distance from point A toward point B.

If the projection plane for the perspective projection is defined to be normal to the axis into the page (hereinafter the z-axis) at a distance d from the page, for a point P to be projected onto the projection plane the projection of P(x,y,z) with coordinates $x_p$ and $y_p$ may be calculated as:

$$\frac{x_p}{d} = \frac{x}{z} \text{ and } \frac{y_p}{d} = \frac{y}{z}.$$

Multiplying each side by d gives:

$$x_p = \frac{x}{z/d} \text{ and } y_p = \frac{y}{z/d}.$$

Hence, the distance d is just a scale factor applied to $x_p$ and $y_p$, while the division by z is what causes the perspective projection of more distant objects to be smaller than that of closer objects.

By defining z/d as perspective value W, a general homogeneous point P(x,y,z) may be represented in perspective space as $[X\ Y\ Z\ W] = [x\ y\ z\ z/d]$. If each side is divided by W (z/d) to return to 3-D, the following results: $[X/W\ Y/W\ Z/W\ 1] = [x_p\ y_p\ z_p\ 1] = [x/(z/d)\ y/(z/d)\ d\ 1]$, which includes the transformed z coordinate of d, the position of the projection plane along the z-axis. Therefore, a three-dimensional image may be represented in two-dimensional perspective space if x, y, z and W are known for an input point to be displayed. This approach is also valid for arbitrary perspective projections since such projections may be normalized in accordance with known techniques.

In prior art 3-D graphics systems, the color of a point on the display screen is determined by first finding the point in the projection plane of the display device and then transforming that point to world space, where the appropriate color is computed. Then, the computed color of that point and any adjacent points are shaded linearly for display by interpolating the points so that smooth color transitions occur. Many such techniques are known and thus will not be described here. However, such prior art pixel rendering systems are not fully accurate in that they do not account for the above-described effects of perspective projections when coloring the points in screen space. In other words, the colors of the displayed pixels are not interpolated so as to account for the effects of perspective foreshortening of the displayed image.

For example, when rendering an image such as that shown in FIG. 1, prior art systems render intermediate points such as point C without considering the effects of nonlinear changes in perspective in screen space on the distances between points A and B. Instead, such prior art systems determine the color of point C by linearly interpolating between points A and B. Thus, if point A were a red pixel and point B were a green pixel, point C would be given a color approximately equal to ½ red plus ½ green. This occurs because point C is displayed at a point in screen coordinates which is approximately half-way between point A and point B. However, as noted above, point C is actually much closer to point A in real world coordinates and hence should have a redder color much closer to that of A. As a result, prior art rendering systems have not adequately reflected the effects of projections in perspective space on the coloring of the pixels on the display, and accordingly, pixels rendered to the screen have not heretofore accurately reflected the proper color gradations for the displayed objects.

Accordingly, there is a long-felt need in the art for a graphics display system wherein the effects of perspective projections of a 3-D image in world space to a 2-D monitor can be accurately reflected in the rendering of the object to the display screen. The present invention has been designed to meet this need.

SUMMARY OF THE INVENTION

The above-mentioned long-felt need has been met in accordance with the present invention by providing means for interpolating pixel values in nonlinear screen perspective space. As a result, when used in a three-dimensional graphics system, the present invention enables colors to be rendered much more realistically by simulating the shading of the rendered object in world space. In other words, by accounting for the perspective projection of each pixel of the rendered object onto the display screen when interpolating the color values of the displayed pixels, the shading of each pixel on the display screen will more accurately reflect the true colors of the rendered object.

In accordance with the invention, a device is provided for scaling parameters associated with display points to be displayed on a display device to account for the effects of perspective foreshortening of the displayed object. Such a device in accordance with the invention comprises means for providing the parameters for a plurality of display points to be displayed on the display device as well as means for providing a perspective value for each of the display points. The perspective value provided for each point allows the parameters of each display point to be scaled in accordance with the perspective values for each display point, thereby allowing the effects of perspective foreshortening to be accounted for when interpolating the pixel values.

In a preferred embodiment of the invention, the scaling means comprises means for respectively subtracting, for each coordinate direction of the display device, a coordinate value of an intermediate display point from a corresponding coordinate value of respective display points with parameter values between which the parameter values of the intermediate display point are to be determined. The respective subtraction results output by the subtracting means are then respectively multiplied by the perspective values of the respective display points, and the respective products output by the multiplying means are added together. Means are then provided for dividing one of the respective products output by the multiplying means by the sum of the respective products output by the adder, the result being output as a perspective scaling factor in accordance with the equation:

$$F = \frac{W_1(C - C_1)}{W_1(C - C_1) + W_2(C_2 - C)}.$$

where F is the fraction of the distance in world space of a current point along an edge of an input polygon from a first end point to a second end point, C is a screen coordinate of the current point, $C_1$ is a corresponding screen coordinate of the first end point, $C_2$ is a corresponding screen coordinate of the second end point, $W_1$ is a perspective value of the first end point, and $W_2$ is a perspective value of the second end point.

In a preferred embodiment of the invention, the scaling means further comprises means for multiplying the difference between corresponding parameter values of the respective display points by the perspective scaling factor F as well as means for subtracting the resulting products from the corresponding parameter values of one of the respective display points. The result is thus the interpolated pixel value as defined by the equation:

$$P = P_1 - F(P_1 - P_2).$$

where P is a parameter of the current point, $P_1$ is a corresponding parameter of the first end point and $P_2$ is a corresponding parameter of the second end point. This process of finding F and P may then be repeated across each scan line of an input polygon to determine the interpolated pixel values of each pixel to be displayed in perspective space.

In accordance with another feature of the invention, the coordinate values of each point of the input polygon ar determined by stepping along an edge of an input polygon in one direction and, for each step along the edge, stepping across the input polygon in another direction substantially perpendicular to the on direction until another edge of the input polygon is reached, the stepping in the one direction and the other direction being repeated until coordinate values of all display points in the input polygon have been determined. Then, for each point of the input polygon, the interpolated pixel values may be determined as mentioned above. These interpolated pixel values may be colors such as red, green and blue, although other parameters such as transparency $\alpha$ or texture map index of the pixels may also be determined in accordance with the invention.

The invention also comprises a method of scaling parameters associated with display points to be displayed on a display device. This method generally comprises the steps of:

providing the parameters for a plurality of display points to be displayed on the display device;

providing a perspective value for each of the display points; and scaling the parameters in accordance with the perspective values for each display point.

The method in accordance with a preferred embodiment of the invention is further characterized in that the scaling step comprises the steps of:

respectively subtracting for each coordinate direction of the display device, a coordinate value of an intermediate display point from a corresponding coordinate value of respective display points with parameter values between which the parameter values of the intermediate display point are to be determined;

respectively multiplying respective subtraction results by the perspective values of the respective display points;

adding respective products from the multiplying step; and dividing one of the respective products from the multiplying step by the sum of the respective products to generate a perspective scaling factor.

Also in accordance with a preferred method of the invention, the scaling step may include the steps of multiplying the difference between corresponding parameter values of the respective display points by the perspective scaling factor to get interpolated results and subtracting the interpolated results from the corresponding parameter values of one of the respective display points. In addition, the coordinate values of the display points of respective input polygons may be determined in accordance with a preferred method of the invention by stepping along an edge of an input polygon in one direction, then for each step along the edge, stepping across the input polygon in another direction substantially perpendicular to the one direction until another edge of the input polygon is reached, and repeating the stepping in the one direction and the other direction until coordinate values of all display points in the input polygon have been determined. In accordance with the method of the invention, the input parameters may be the rendering colors of red, green and blue as well as a value indicating the transparency of the displayed pixel. Of course other parameters affected by the perspective foreshortening of the displayed object may also be used as the input parameters.

In accordance with another aspect of the invention, a method is provided for scaling parameters associated with display points of respective polygons to be displayed on a display device in accordance with perspective changes in a world coordinate system of objects to be displayed. Such a method in accordance with the invention comprises the steps of:

(1) stepping from display point to display point along an edge of an input polygon in a direction other than a scan direction;

(2) for each scan line of the input polygon, performing the steps of:

(a) calculating a fraction of the distance in world space of a start point along the edge at the beginning of a current scan line from a first end point of the edge to a second end point of the edge in accordance with the equation:

$$F = \frac{W_1(C - C_1)}{W_1(C - C_1) + W_2(C_2 - C)}$$

where F is the fraction of the distance in world space of the start point along the edge from the first end point to the second end point, C is a screen coordinate of the start point, $C_1$ is a corresponding screen coordinate of the first end point, $C_2$ is a corresponding screen coordinate of the second end point, $W_1$ is a perspective value of the first end point, and $W_2$ is a perspective value of the second end point;

(b) calculating the parameters for the start point using corresponding parameters of the first and second end points and the distance fraction F in accordance with the equation:

$$P = P_1 - F(P_1 - P_2),$$

where P is a parameter of the current display point, $P_1$ is a corresponding parameter of the first end point and $P_2$ is a corresponding parameter of the second end point;

(c) repeating step (a) for an end point on another edge of the input polygon at a point in which the another edge is intersected by the current scan line; and (d) repeating step (b) for the end point on the another edge, where the distance fraction F is that determined in step (c); and (3) for each display point along the current scan line of the input polygon, performing the steps of:

(a) repeating step (2)(a) for the current display point where the first and second end points are replaced by the start and end points of the scan line, respectively; and (b) repeating step (2)(b) for the current display point where the first and second end points are replaced by the start and end points of the scan line, respectively, and the fraction F is that determined in step (3)(a).

The above-mentioned features of the invention are particularly useful in a 3-D graphics rendering system for assuring that the rendered colors are interpolated linearly in world space, not in perspective space as in the prior art.

BRIEF DESCRIPTION OF THE DRAWINGS

The objects and advantages of the invention will become more apparent and more readily appreciated from the following detailed description of the presently preferred exemplary embodiment of the invention taken in conjunction with the accompanying drawings of which.

DETAILED DESCRIPTION OF THE PRESENTLY PREFERRED EMBODIMENT

The inventor of the subject matter disclosed and claimed herein has satisfied the above-mentioned long-felt need in the art by developing a method and apparatus for scaling pixel parameter values in accordance with real-world perspective values so that the pixel parameters may be modified to create a more realistic projection of a three-dimensional image onto the display screen. In particular, the colors rendered to the display screen will be shaded nonlinearly on the display plane to account for the effects of perspective foreshortening.

A device with these and other beneficial features in accordance with a presently preferred exemplary embodiment of the invention will be described below with reference to FIGS. 2-5. It will also be appreciated by those of ordinary skill in the art that the description given herein with respect to those figures is for exemplary purposes only and is not intended in any way to limit the scope of the invention. All questions regarding the scope of the invention may be resolved by referring to the appended claims.

Figure 2:
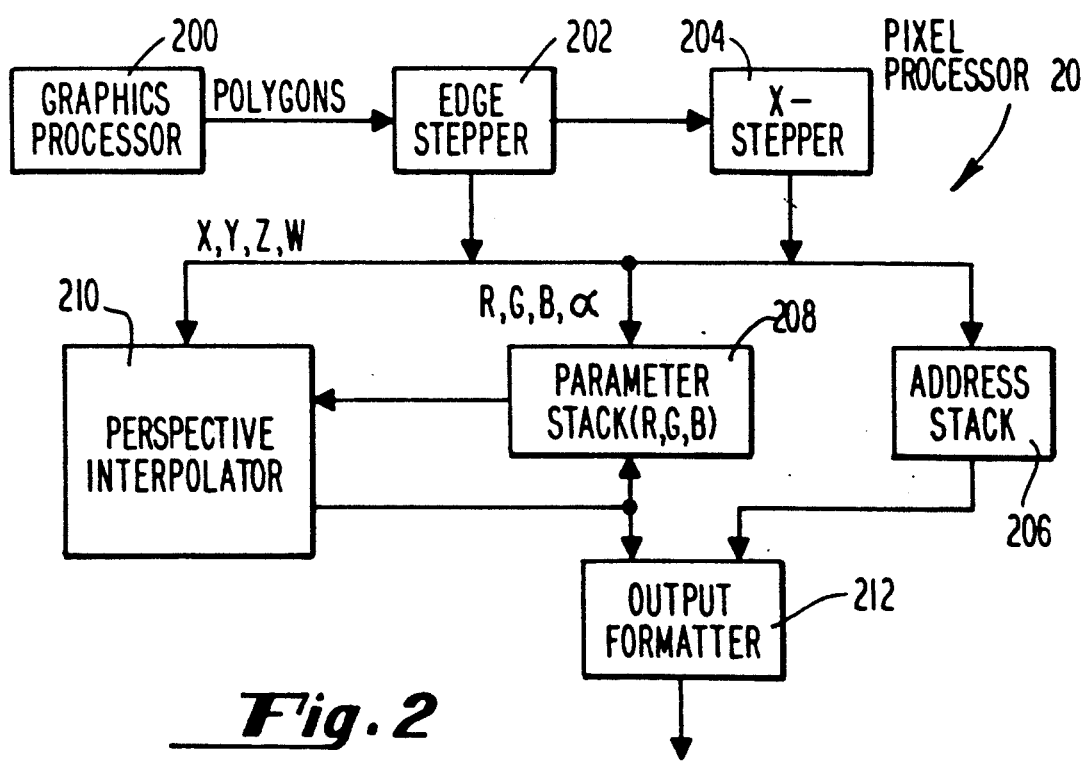
FIG. 2 schematically illustrates a pixel processor for providing nonlinear perspective scaling of display parameters in accordance with the invention.

FIG. 2 shows an embodiment of a pixel processor 20 incorporating the invention. In general, such a pixel processor 20 receives processed graphics primitives which are then further processed for display on the display screen. Such processed graphics primitives may be supplied by a graphics processor 200 preferably in the form of respective polygons which together form a representation of the original image which is to be reproduced on the display screen, although other representations of the processed graphics primitives may be used in accordance with the invention. For purposes of description, it will be assumed that respective polygons are output by graphics processor 200 for display.

Figure 1:
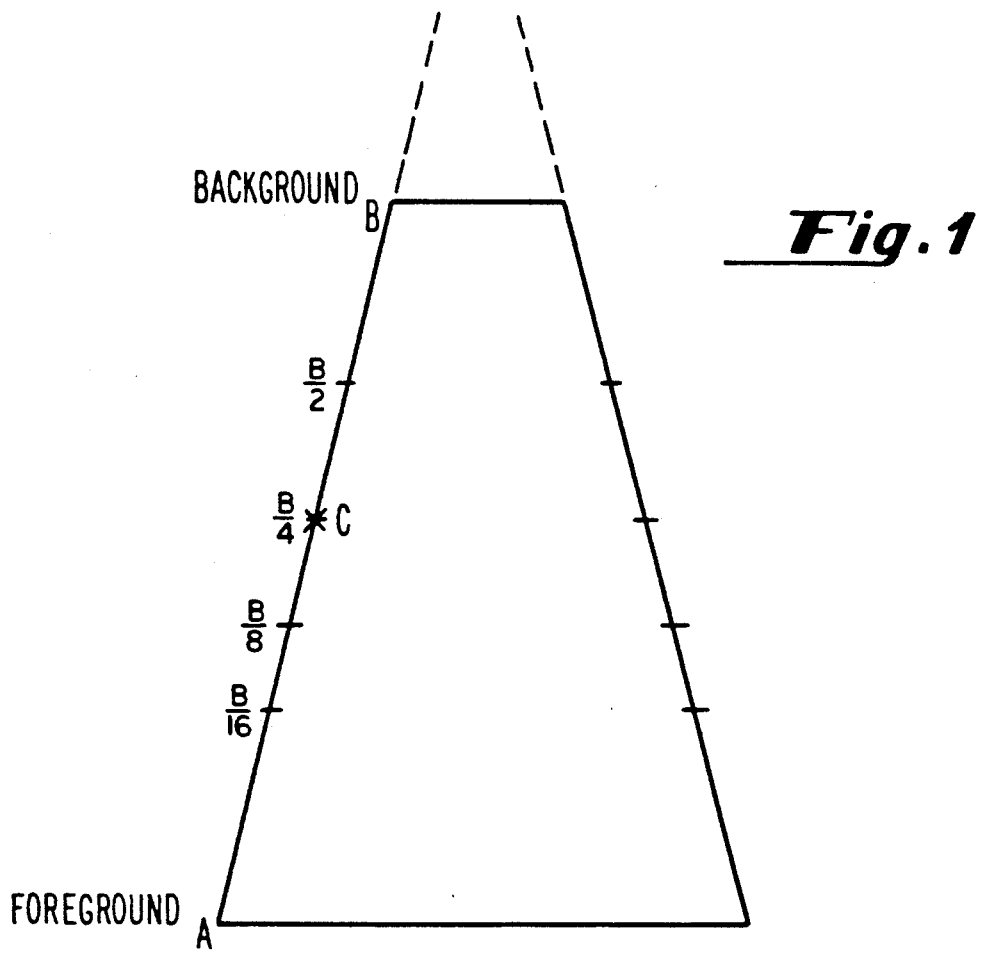
FIG. 1 illustrates perspective foreshortening by showing a perspective projection of parallel lines into the field of the page.

An example of a possible input polygon was shown in FIG. 1. The image in that figure may be described as a four-sided input polygon having opposite sides which are parallel to each other and the scan line. Of course, a triangle having a base parallel to the scan line is also a preferable input polygon since stepping across a triangle (as will be described below) to read in its pixels is quite simple. However, as would be apparent to one skilled in the art, the input polygons may have any number of vertices and any orientation desired.

The input polygons typically include a plurality of points within the boundaries thereof which have predetermined color (red, green and blue) values and brightnesses, as well as a predetermined transparency value $\alpha$ i.e., the pixel is solid or is blended with another image). Also, in accordance with the invention, each point in the input polygon has associated therewith a perspective scaling value W which is included in its data along with its X, Y and Z coordinate values (i.e., a point is defined as [X,Y,Z,W]). As described in the background portion of the specification, this perspective scaling value W is used to scale the x, y and z values of a point on the projection plane to provide the proper perspective projection of a object onto the display screen.

The perspective scaling values W for each point increase in value as any of the X, Y and Z values approach their vanishing point and may be used in accordance with the invention to modify all shading values associated with each pixel to account for changes in the perspective values at each display point. The values of W are thus unique for each graphics primitive and are carried via graphics processor 200 to pixel processor 20 for each point to be displayed on the display screen. As will be described in more detail below, the perspective scaling value W for each pixel enables the present invention to adjust pixel parameters for distances in perspective screen space so that the pixels may be shaded in accordance with the distances between corresponding points in world space. This process is done for each pixel within each input polygon so that the parameter values of each pixel may be properly interpolated to account for the effects of nonlinear perspective foreshortening in screen space. Each input polygon from graphics processor 200 is applied in accordance with the invention to an edge stepper 202 and an X-stepper 204 so that the perspective interpolation in accordance with the invention may be performed for each point within the polygon. This process will be described for an arbitrary input polygon of the type shown in FIG. 3.

An input polygon having vertices A, B, C and D defined by their X and Y coordinates and W perspective values is processed by edge stepper 202 and X-stepper 204 in accordance with the invention to read in the data for each point in each input polygon. For example, edge stepper 202 will receive data identifying the input polygon by its vertices A, B, C and D, from which the equations of the line segments connecting the vertices to form the polygon may be determined. Edge stepper 202 will start at a first vertex such as A and determine the Y coordinate (assuming X is the scan direction) value for the first point o the segment AB towards vertex B. X-stepper 204 will then determine the X coordinate value for each point across the polygon until another segment of the polygon such as segment AC is reached. Edge stepper 202 will then increment the Y coordinate value along segment AB towards vertex B and the X stepping will be repeated. For example, scanning for each scan line starts at a point on the scan line along segment AB having coordinate values $X_s$ and $Y_2$ and perspective value $W_s$. Edge stepper 202 assigns the Y coordinate value to be $Y_s$ for that scan line, and X-stepper 204 steps across the polygon until segment CD is reached at the point with coordinates $X_e$ and $Y_e$ and perspective value $W_e$. In this manner, the parameters for each pixel of the input polygon may be read in for perspective interpolation in accordance with the invention.

The X and Y coordinate values of each read in pixel are maintained in address stack 206, while the corresponding parameter values for each pixel are stored in parameter stack 208. As noted above, these parameters may include red, green and blue values and transparency value $\alpha$. The coordinate values X, Y and Z and the perspective scaling value W for each pixel are applied to perspective interpolator 210 for scaling the pixel parameters in accordance with the invention. The scaled pixel parameters are then forwarded to output formatter 212 for associating the scaled pixel parameters with the corresponding coordinate values stored in address stack 206. The output of output formatter 212 is then sent to downstream hardware for display.

The procedure followed by perspective interpolator 210 to interpolate shading parameters of the polygons will now be described. Basically, perspective interpolator 210 implements two equations, the first for determining the fraction of total distance in perspective space an input point is between a first point and a second point between which the input point is to be interpolated, and the second for interpolating the shading parameters of the input point in accordance with the corresponding shading parameters of the interpolating points and the calculated fraction. The distance fraction F in accordance with the invention may be calculated using the following equation:

$$F = \frac{W_1(C - C_1)}{W_1(C - C_1) + W_2(C_2 - C)} \quad \text{Equation (1)}$$

where C is the screen coordinate at the input point whose parameters are to be interpolated, $C_1$ is the screen coordinate of a first interpolating point (such as vertex A), and $C_2$ is the screen coordinate of a second interpolating point (such as vertex B), where C, $C_1$ and $C_2$ may be either the X, Y or Z coordinates but must be of the same type for each calculation of distance fraction F (e.g., C, $C_1$ and $C_2$ may be X coordinate values), and $W_1$ is the perspective scaling value of the first interpolating point and $W_2$ is the perspective scaling value of the second interpolating point.

Equation 1 may be derived by defining a fraction F between 0 and 1 which describes the relative travel distance from a first point to a second point (i.e., $x = x_1 + F(x_2 - x_1)$) in world space. Then, in accordance with the invention the known coordinate values $X_1$ and $X_2$ in screen space as well as the perspective scaling values $W_1$ and $W_2$ in world space of two interpolating points are used to find the relative distance in perspective screen space that an input point is from points $x_1$ and $x_2$. If the display coordinates in screen space are defined as:

$$X_1 = \frac{x_1}{W_1}, \quad X_2 = \frac{x_2}{W_2} \text{ and } X = \frac{x}{W}.$$

where $x = x_1 + F(x_2 - x_1)$ and $W = W_1 + F(W_2 - W_1)$, then:

$$X = \frac{x_1 + F(x_2 - x_1)}{W_1 + F(W_2 - W_1)}.$$

Solving this equation for F gives:

$$F = \frac{XW_1 - x_1}{(x_2 - x_1) - X(W_2 - W_1)}$$

in screen space and substituting for $x_1$ and $x_2$ gives:

$$F = \frac{W_1(X - X_1)}{W_2(X_2 - X) + W_1(X - X_1)}.$$

The interpolation in accordance with the invention is simply performed by taking the distance fraction F calculated in Equation (1) and interpolating for each parameter of the input pixel:

$$P = P_1 - F(P_1 - P_2) \quad \text{Equation (2)}$$

where P is a shading parameter of the input point, $P_1$ is the corresponding shading parameter of the first interpolating point, and $P_2$ is the corresponding shading parameter of the second interpolating point. Each parameter passed from graphics processor 200 is passed through Equation (2) for each point in the input polygon. For example, if an input point (X,Y,Z,W) has the shading parameters red, green, blue and $\alpha$ associated therewith, then Equation (2) must be used four times for that point. The process is then repeated for each other point in the input polygon.

Figure 3:
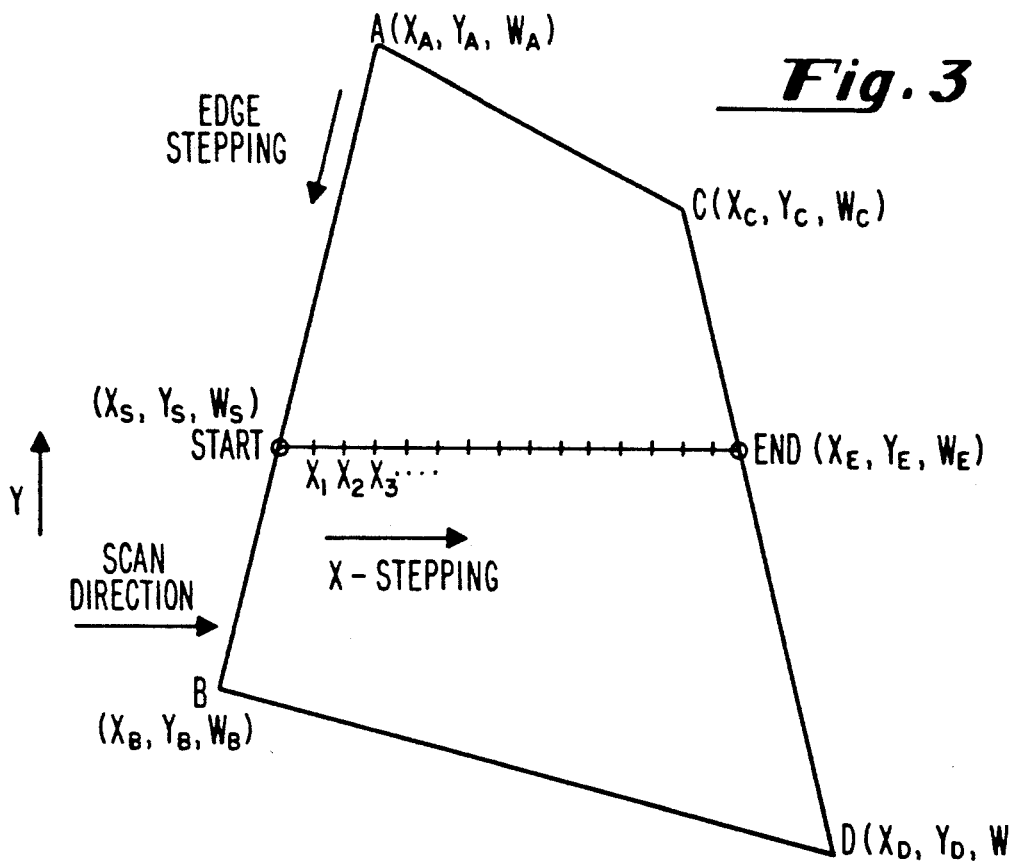
FIG. 3 illustrates an input polygon for which the pixel parameters are scaled in accordance with the invention.

The procedure for interpolating parameters in perspective space will now be described with reference to FIG. 3

For each scan line of an input polygon to be rendered, the distance fraction F in world space from a first vertex A to a second vertex B for the starting point ($X_s$, $Y_s$, $W_s$) of the current scan line is calculated using Equation (1). Each of the scaled parameters R,G,B and $\alpha$ at point ($X_s$, $Y_s$, $W_s$) is then calculated using the associated R,G,B and $\alpha$ parameters at vertex A and vertex B and the distance fraction F calculated using Equation (1). This is accomplished using Equation (2). Then, the distance fraction F in world space from vertex C to vertex D for the end point ($X_e$, $Y_e$, $W_e$) of the current scan line is calculated using Equation (1). Each of the scaled parameters R,G,B, and $\alpha$ at point ($X_e$, $Y_e$, $W_e$) is then calculated using the associated R,G,B and $\alpha$ parameters at vertex C and vertex D and the distance fraction F calculated for point ($X_e$, $Y_e$, $W_e$) using Equation (2). The coordinates of the end points of the scan line are then used to calculate the fraction of the distance in world space that the input point is from start point ($X_s$, $Y_s$, $W_s$) to end point ($X_e$, $Y_e$, $W_e$). This is again done using Equation (1), with the start point and the end point used in place of the vertices. Finally, the scaled parameters at the input point are then calculated using the corresponding scaled parameters R,G,B and $\alpha$ at start point ($X_s$, $Y_s$, $W_s$) and end point ($X_e$, $Y_e$, $W_e$) previously calculated. This is done again using Equation (2).

Figure 5:
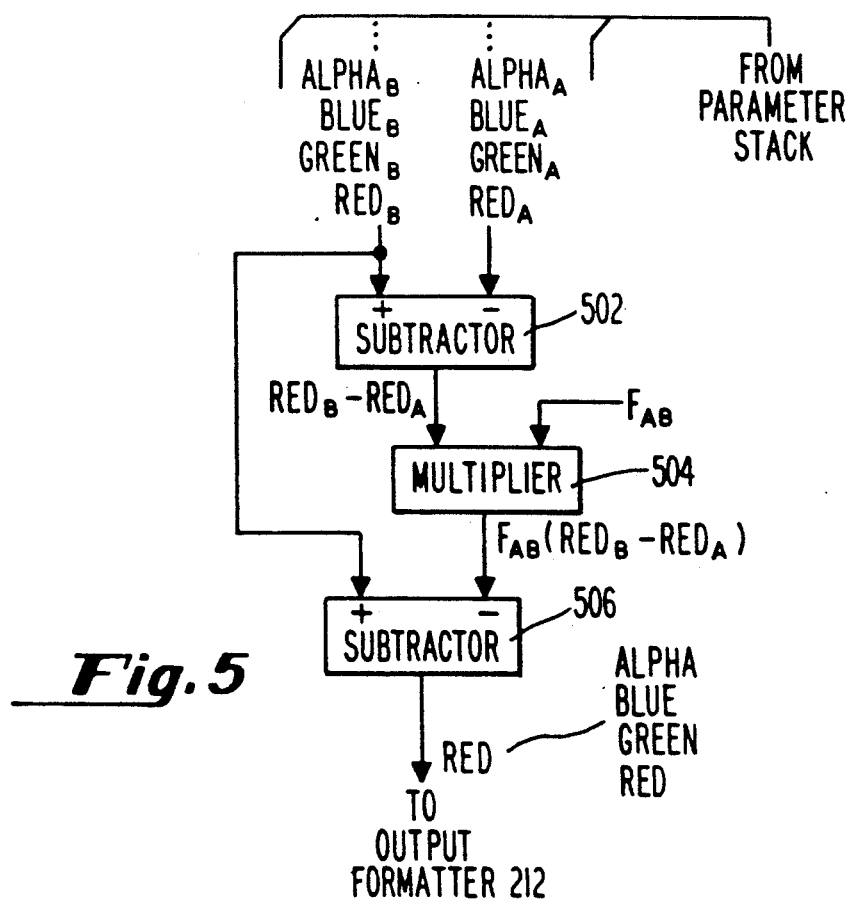
FIG. 5 schematically illustrates a circuit for interpolating a display parameter of an input pixel in accordance with the perspective scaling factor determined by the circuit of FIG. 4.
Figure 4:
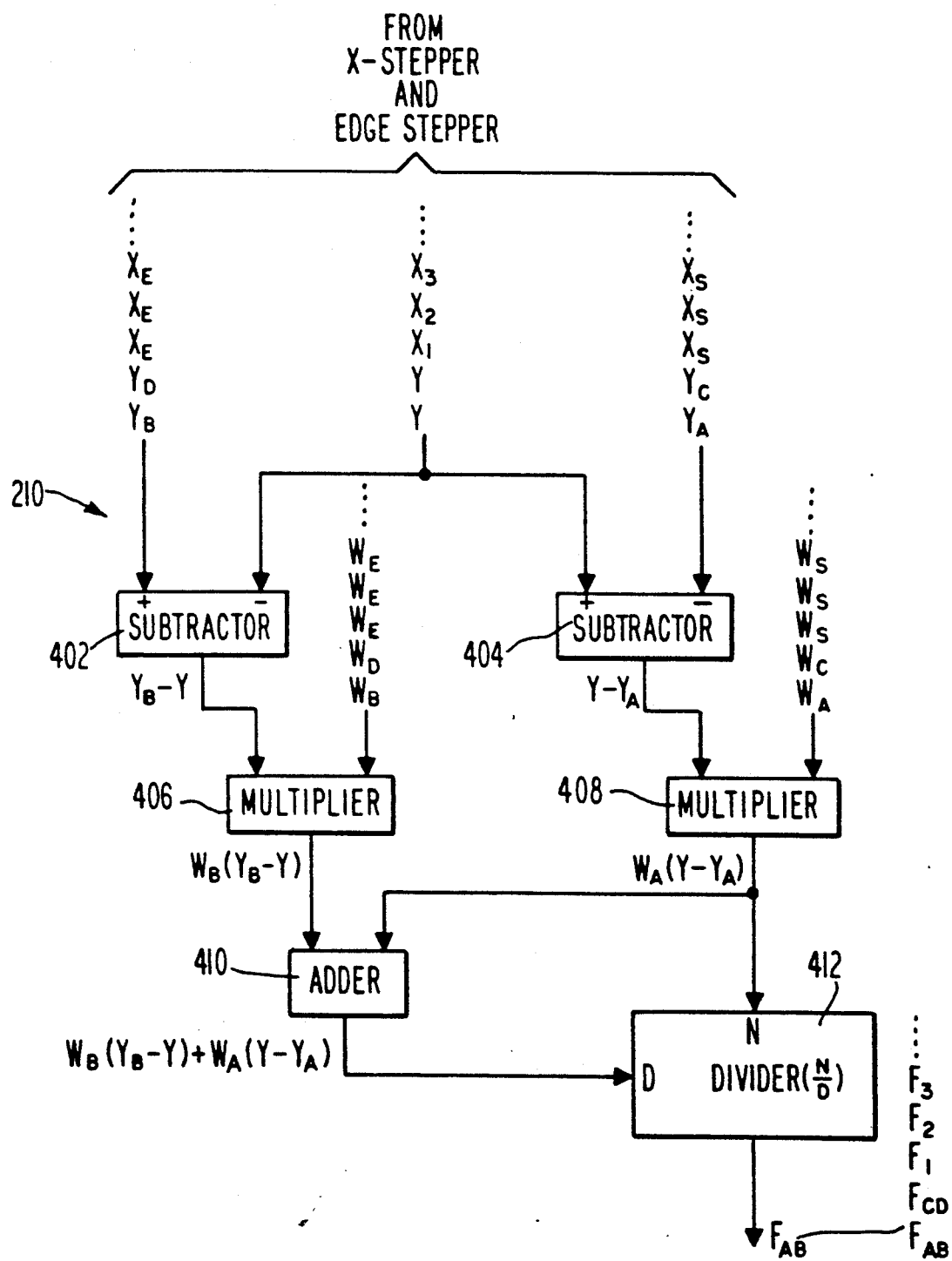
FIG. 4 schematically illustrates a circuit for determining the perspective scaling factor as a fraction of the distance of a given point of an input polygon between interpolating points in perspective space.

Equations (1) and (2) may in accordance with the invention may be implemented in software but may also be easily implemented in hardware as shown in FIGS. 4 and 5. FIG. 4 shows the hardware implementation of Equation (1), where the input coordinate values from edge stepper 202 and X-stepper 204 are applied to respective subtractors 402 and 404 as indicated to determine a subtraction result. The respective subtraction results are then applied to multipliers 406 and 408 along with respective perspective scaling values W of the points between which interpolation is to be performed. The products of multipliers 406 and 408 are then added at adder 410, and the sum is applied to divider 412 in order to determine the distance fraction F of Equation (1). Values are shown at the output of each of the elements for the first iteration of data for finding the distance fraction F for the scan line starting at start point ($X_s$, $Y_s$, $W_s$) as shown in FIG. (3).

Shading parameter values from parameter stack 208 for each of the interpolating points are then applied to subtractor 502 as shown in FIG. 5 to determine the differences in the shading parameter values for these points. This difference is then multiplied by the distance fraction F determined by the circuit of FIG. 4 at multiplier 504, and the product is applied to a negative input of subtractor 506 along with one of the shading parameter values of the interpolating points. The output of subtractor 506 thus corresponds to the interpolated value of the input shading parameter for the input point, and this value is output to output formatter 212. As described above, this process is repeated for all parameters to be processed for each point rendered, and the value for the distance fraction F is repeatedly calculated or held constant for parameter interpolation. In other words, depending upon the relative processing speeds, the value of distance fraction F may be calculated for each iteration or may be stored in a temporary memory.

The perspective interpolator 210 in accordance with the invention thus eliminates the errors inherent in prior art systems caused by pixel value interpolations which do not account for the nonlinear effect caused by perspective foreshortening when linearly related objects in 3-D world space are projected into 2-D perspective space. Errors in output colors are thus minimal in accordance with the invention since the errors are limited merely to round-off errors in the interpolation process. Also, the process in accordance with the invention is efficient since a transformation to world space is not necessary in order to implement the perspective scaling in accordance with the invention. Moreover, the technique in accordance with the invention may be implemented in software or hardware as desired by the designer in order to meet throughput limitations.

Although an exemplary embodiment of the invention has been described in detail above, those skilled in the art will readily appreciate that many additional modifications are possible in the exemplary embodiment without materially departing from the novel teachings and advantages of the invention. For example, texture mapping parameters including indices into texture map space may be scaled in accordance with the invention. In addition, specular and diffuse colors may be separated using the techniques in accordance with the invention. Accordingly, all such modifications are intended to be included within the scope of this invention as defined in the following claims.

What is claimed:

1. A graphics display system for displaying three dimensional images in world coordinates on a two dimensional display screen in display coordinates whereby the intensity values of respective pixels of the perspective projections of said three dimensional images onto said two dimensional display screen are nonlinearly scaled in display space to account for the nonlinear effects of perspective foreshortening on said perspective projections of said three dimensional images onto said two dimensional display screen, comprising:

means for representing said three dimensional images as a plurality of polygons projected onto a display plane, said polygons being represented by intensity values and perspective projection values of respective vertices of said plurality of polygons, and said perspective projection values representing the nonlinear effects of perspective foreshortening on an input polygon defined by respective vertices in said display plane;

means for providing said intensity values and said perspective projection values for said respective vertices of said input polygon and for providing display coordinates for each intermediate pixel in said input polygon whose intensity value is to be interpolated;

a perspective interpolator for determining the intensity values of each said intermediate pixel in said input polygon from the intensity values and said perspective projection values of the respective vertices of said input polygon by interpolating the intensity values of the respective vertices of said input polygon in accordance with said perspective projection values at said respective vertices of said input polygon so as to account for the effects of perspective foreshortening on said input polygon in said display plane; and output formatting means for providing the interpolated intensity values for each said intermediate pixel in said input polygon to said two dimensional display screen for display at predetermined display coordinates for each said intermediate pixel.

2. A graphics display system as in claim 1, wherein said perspective interpolator comprises:

means for respectively subtracting, for each display coordinate direction of said display screen, an intensity value of an intermediate pixel of said input polygon from a corresponding intensity value of a first pixel of said input polygon having known intensity values and for respectively subtracting, for each display coordinate direction of said display screen, a corresponding intensity value of a second pixel of said input polygon having known intensity values from said intensity value of said intermediate pixel of said input polygon, said first and second pixels having intensity values between which the intensity values of said intermediate pixel are to be interpolated;

means for respectively multiplying respective subtraction results output by said subtracting means by the perspective projection values of said first and second pixels;

means for adding respective products output by said multiplying means; and means for dividing one of said respective products output by said multiplying means by the sum of said respective products output by said adding means to generate a perspective scaling factor representative of said nonlinear effects of perspective foreshortening on said input polygon at said intermediate pixel.

3. A graphics display system as in claim 2, wherein said perspective interpolator further comprises:

interpolating means for multiplying the difference between said corresponding intensity values of said first and second pixels of said input polygon by said perspective scaling factor of said intermediate pixel; and means for subtracting products output by said interpolating means from the corresponding intensity value of said second pixel to get the interpolated intensity values for said intermediate pixel.

4. A graphics display system as in claim 3, wherein said perspective interpolator comprises a parameter storing means for sequentially storing intensity values for said first and second pixels and an address storing means for sequentially storing display coordinates of each pixel in said input polygon during the interpolation of the intensity values of the intermediate pixels of said input polygon.

5. A graphics display system as in claim 1, wherein said representing means comprises a graphics processor.

6. A graphics display system as in claim 1, wherein said providing means comprises edge stepping means for stepping along respective edges of said input polygon in a direction perpendicular to a scan line direction and providing to said perspective interpolator a display coordinate in said direction perpendicular to said scan line direction as well as said intensity values for vertices at endpoints of each of said edges, and scan line stepping means for stepping along each scan line in said input polygon between respective edges of said input polygon and providing to said perspective interpolator a display coordinate in said scan line direction as well as intensity values for pixels of said edges which intersect a current scan line.

7. A graphics display system as in claim 6, wherein said edge stepping means steps along an edge of said input polygon in said direction perpendicular to said scan line direction and input polygon, across the input polygon in said scan line direction until another edge of the input polygon is reached, said edge stepping means stepping along respective edges of said input polygon and said scan line stepping means stepping along each scan line in said input polygon until intensity values and perspective projection values for all intermediate pixels in said input polygon have been provided to said perspective interpolator for interpolation.

8. A graphics display system as in claim 1, wherein said intensity values provided by said providing means include red, green and blue pixel values and further include at least one of a transparency value and a texture map index value for said respective vertices of said input polygon.

9. A method of displaying three dimensional images in world coordinates on a two dimensional display screen in display coordinates whereby the intensity values of respective pixels of the perspective projections of said three dimensional images onto said two dimensional display screen are nonlinearly scaled in display space to account for the nonlinear effects of perspective foreshortening on said perspective projections of said three dimensional images onto said two dimensional display screen, comprising the steps of:
representing said three dimensional images as a plurality of polygons projected onto a display plane, said polygons being represented by intensity values and perspective projection values of respective vertices of said plurality of polygons, and said perspective projection values representing the nonlinear effects of perspective foreshortening on an input polygon defined by respective vertices in said display plane;
providing said intensity values and said perspective projection values for said respective vertices of said input polygon and for providing display coordinates for each intermediate pixel in said input polygon whose intensity value is to be interpolated;
determining the intensity values of each pixel in said input polygon from the intensity values and said perspective projection values of the respective vertices of said input polygon by interpolating the intensity values of the respective vertices of said input polygon in accordance with said perspective projection values at said respective vertices of said input polygon so as to account for the effects of perspective foreshortening on said input polygon in said display plane; and
formatting the interpolated intensity values for each said intermediate pixel in said input polygon for display on said two dimensional display screen at predetermined display coordinates thereof.

10. A method as in claim 9, wherein said intensity values determining step comprises the steps of:
respectively subtracting, for each display coordinate direction of said display screen, an intensity value of an intermediate pixel of said input polygon from a corresponding intensity value of a first pixel of said input polygon having known intensity values;
respectively subtracting, for each display coordinate direction of said display screen, a corresponding intensity value of a second pixel of said input polygon having known intensity values from said intensity value of said intermediate pixel of said input polygon, said first and second pixels having intensity values between which the intensity values of said intermediate pixel are to be interpolated;
respectively multiplying respective subtraction results output in said subtracting steps by the perspective projection values of said first and second pixels;
adding respective products output in said multiplying step; and
dividing one of said respective products output in said multiplying step by the sum of said respective products output in said adding step to generate a perspective scaling factor representative of said nonlinear effects of perspective foreshortening on said input polygon at said intermediate pixel.

11. A method as in claim 10, wherein said intensity values determining step comprises the steps of:
multiplying the difference between said corresponding intensity values of said first and second pixels of said input polygon by said perspective scaling factor of said intermediate pixel; and
subtracting products output in said difference multiplying step from the corresponding intensity value of said second pixel to get an interpolated intensity values for said intermediate pixel.

12. A method as in claim 9, wherein said display coordinate providing step comprises the steps of stepping along respective edges of said input polygon in a direction perpendicular to a scan line direction and providing a display coordinate in said direction perpendicular to said scan line direction as well as said intensity values for vertices at endpoints of each of said edges, and stepping along each scan line in said input polygon between respective edges of said input polygon and providing a display coordinate in said scan line direction as well as said intensity values for pixels of said edges which intersect a current scan line.

13. A method as in claim 9, wherein said intensity values provided in said intensity value providing step include red, green and blue pixel values and further include at least one of a transparency value and a texture map index value for said respective vertices of said input polygon.

14. A method of displaying three dimensional images in world coordinates on a two dimensional display screen in display coordinates whereby the intensity values of respective pixels of the perspective projections of said three dimensional images onto said two dimensional display screen are nonlinearly scaled in display space to account for the nonlinear effects of perspective foreshortening on said perspective projections of said three dimensional images onto said two dimensional display screen, comprising the steps of:
(1) representing said three dimensional images as a plurality of polygons projected onto a display plane, said polygons being represented by intensity values and perspective projection values of respective vertices of said plurality of polygons, and said perspective projection values representing the nonlinear effects of perspective foreshortening on an input polygon defined by respective vertices in said display plane;
(2) providing said intensity values and said perspective projection values for said respective vertices of said input polygon and providing display coordinates for each intermediate pixel in said input polygon whose intensity value is to be interpolated;

(3) stepping from pixel to pixel along an edge of said input polygon in a direction perpendicular to a scan line direction and providing a display coordinate in said direction perpendicular to said scan line direction;

(4) for each scan line of said input polygon, performing the steps of:

(a) calculating a fraction of the distance in world coordinates of a start pixel along said edge at the beginning of a current scan line from a first end pixel of said edge to a second end pixel of said edge in accordance with the equation:

$$F = \frac{W_1(C - C_1)}{W_1(C - C_1) + W_2(C_2 - C)}.$$

where F is the fraction of the distance in world coordinates of the start pixel along said edge from said first end pixel to said second end pixel, C is a display coordinate of the start pixel in said direction perpendicular to said scan line direction, $C_1$ is a corresponding display coordinate of the first end pixel, $C_2$ is a corresponding display coordinate of the second end pixel, $W_1$ is the perspective projection value of the first end pixel, and $W_2$ is the perspective projection value of the second end pixel;

(b) calculating the intensity values for said start pixel using corresponding intensity values of said first and second end pixels and said distance fraction F in accordance with the equation:

$$P = P_1 - F(P_1 - P_2).$$

where P is an intensity value of the current pixel, $P_1$ is a corresponding intensity value of said first end pixel and $P_2$ is a corresponding intensity value of said second end pixel;

(c) repeating step (a) for an end pixel on another edge of said input polygon at a pixel in which said another edge is intersected by the current scan line; and (d) repeating step (b) for said end pixel on said another edge, where the distance fraction F is that determined in step (c);

(5) for each pixel along the current scan line of said input polygon, performing the steps of:

(a) repeating step (4)(a) for the current pixel in said current scan line where said first and second end pixels are replaced by said start and end pixels of the current scan line, respectively; and (b) repeating step (4)(b) for the current pixel in said current scan line where said first and second end pixels are replaced by said start and end pixels of the current scan line, respectively, and said fraction F is that determined in step (5)(a); and (6) formatting the intensity values calculated for each pixel in said input polygon for display on said two dimensional display screen at predetermined display coordinates thereof.

\* \* \* \* \*

UNITED STATES PATENT AND TRADEMARK OFFICE
CERTIFICATE OF CORRECTION

PATENT NO. : 5,222,204
DATED : June 22, 1993
INVENTOR(S) : Roger W. Swanson

It is certified that error appears in the above-indentified patent and that said Letters Patent is hereby corrected as shown below:

Col. 13, l. 4 -- after "and" insert --said scan line stepping means steps, for each scan line in said--

Col. 13, l. 40 -- after "and" delete "for"

Col. 14, l. 25 -- delete "valves" and insert therefor --value--

Col. 16, l. 13 -- delete "an d" and insert therefor --and--

Signed and Sealed this

Nineteenth Day of December, 1995

Attest:

BRUCE LEHMAN

Attesting Officer

Commissioner of Patents and Trademarks